(12) United States Patent
Aghevli

(10) Patent No.: US 6,518,988 B1
(45) Date of Patent: Feb. 11, 2003

(54) VIRTUAL MANIPULATIVES

(76) Inventor: Behrouz B. Aghevli, 8380 Greensboro Dr. #921, McLean, VA (US) 22201

( * ) Notice: Subject to any disclaimer, the term of this patent is extended or adjusted under 35 U.S.C. 154(b) by 0 days.

(21) Appl. No.: 09/277,722

(22) Filed: Mar. 29, 1999

Related U.S. Application Data

(60) Provisional application No. 60/080,298, filed on Apr. 1, 1998.

(51) Int. Cl.[7] .............................................. G06K 15/00
(52) U.S. Cl. ...................................... 345/826; 345/709
(58) Field of Search ................................ 345/709, 748, 345/752, 754, 760, 746, 826, 765, 769, 762–763, 821–823, 825, 840, 846–847, 771, 773; 707/10; 704/330–231

(56) References Cited

U.S. PATENT DOCUMENTS

| | | | | |
|---|---|---|---|---|
| 5,469,538 A | * | 11/1995 | Razdow | 395/140 |
| 6,029,156 A | * | 2/2000 | Lannert et al. | 706/11 |
| 6,032,141 A | * | 2/2000 | O'Connor et al. | 706/45 |
| 6,101,489 A | * | 8/2000 | Lannert et al. | 706/45 |
| 6,125,358 A | * | 9/2000 | Hubbell et al. | 706/11 |
| 6,201,948 B1 | * | 3/2001 | Cook et al. | 434/350 |
| 6,278,450 B1 | * | 8/2001 | Arwri et al. | 345/826 |

* cited by examiner

Primary Examiner—Steven Sax
(74) Attorney, Agent, or Firm—Richard M. Lebovitz

(57) ABSTRACT

The present invention relates to various aspects of virtual manipulatives, including their use as instructional tools for building skills in mathematics. The invention also provides a system for disseminating such instructional tools on the Internet and through other connected networks.

13 Claims, 5 Drawing Sheets

VIRTUAL MANIPULATIVES

CROSS-REFERENCE TO RELATED APPLICATION

This application is a continuation-in-part of provisional Ser. No. 60/080,298, filed Apr. 1, 1998 pending, which is hereby incorporated by reference.

BACKGROUND OF THE INVENTION

The present invention relates to virtual manipulatives that can be used for a variety of different purposes, including as instructional tools, e.g., in mathematics, and as design and engineering tools. It also relates to instructional systems for creating activities associated with virtual manipulatives and disseminating these activities, e.g., via the World Wide, electronic networks, and CD-ROM and similar storage devices.

DETAILED DESCRIPTION

Figure 1:
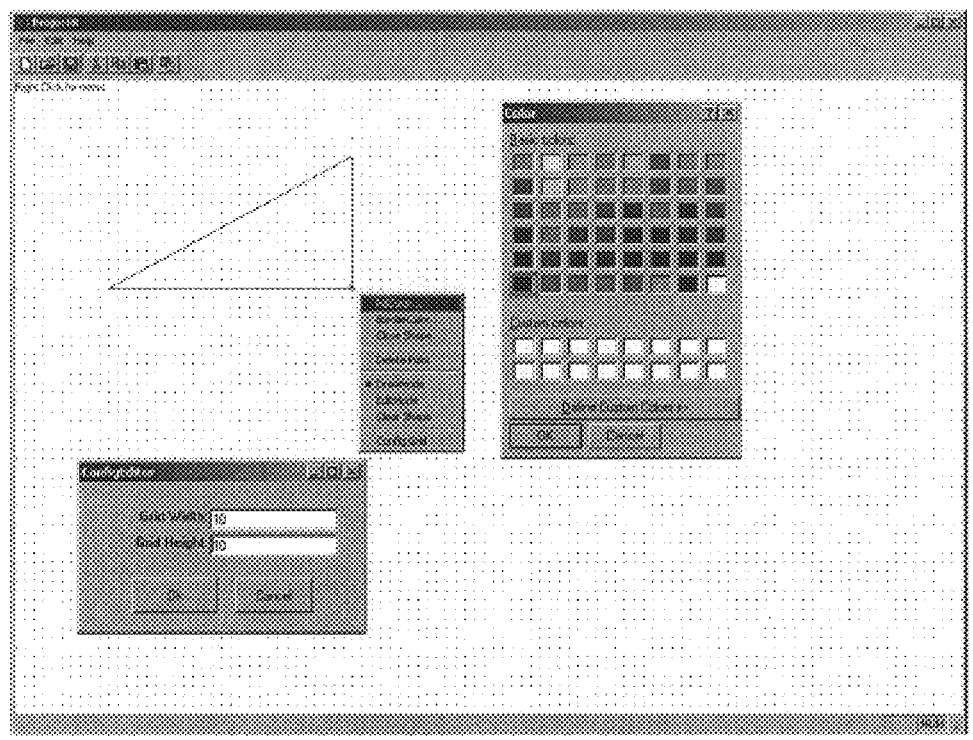
FIG. 1 shows a virtual manipulative designer.

The present invention relates to means for and methods of generating, manipulating, scaling, etc., objects in an electronic medium. In preferred embodiments, object generation and manipulation can be utilized in combination with content material (e.g., written text) as an instructional tool, e.g., to develop ideas and skills in mathematics. In other aspects of the invention, the methods can be used for modeling, designing, and arranging objects for architectural, medical, engineering, and other uses. Object display and manipulation can be performed in any desired environment, including two-dimensional, three-dimensional, and immersive virtual environments.

One aspect of the invention is to provide a dynamic interactive curriculum in an electronic media, e.g., as deployed on the World Wide Web, on CD-ROM, on connected computer networks (local or global), etc. Virtual manipulatives, as used herein are electronic versions of physical manipulatives or physical objects, such as multi-based blocks, cubs (FIG. 4), tiles, base ten blocks, pentomineos, pattern blocks, polygons, fraction circles, algeblocks, attribute blocks, tangrams, triangles (see, e.g., FIG. 3), factor blocks, three-dimensional shapes, etc. Virtual manipulatives can be displayed on a computer screen in a form which can be manipulated by users. For instance, using a mouse, or other means for controlling virtual manipulatives, users can generate and move on-screen manipulatives to explore their properties and use them in solving mathematical problems. The virtual manipulatives can be depicted as movable and scalable graphical objects (in two- or three-dimensions) which can be utilized by users to assist them in learning spatial relations, solving problems, arithmetic, and other math skills.

In preferred aspects of the invention, a user interface allows users (e.g., learners, students, etc.) to move and interact with virtual objects through user input, e.g., from a mouse or other input means. Maneuvering computer-generated objects in a virtual space provides the opportunity to develop new associations and thinking concepts. One aspect of this activity is to place students in control of their own learning, creating the chance to apply newly discovered concepts to new problems and tasks. The user interface can be coupled with any desired content, curriculum, activity, etc., to foster learning and instruction. Content material can be text, graphics, moving images, auditory information, olfactory information, etc.

In one embodiment, the invention is an interactive instructional tool which provides a learner with a series of activities which, when performed by the learner, illustrate and teach selected mathematical ideas and principles. The series of activities can be retrieved and displayed on a computer screen in a predetermined order to guide the learner through a curriculum designed to develop and sharpen mathematical skills. For instance, virtual manipulatives can be utilized for teaching a variety of mathematical concepts, including, perimeter, area, conservation of matter, fractions, whole number arithmetic, and abstract algebraic equations.

In one example, an activity generator furnishes learners with (1) a means for generating, scaling, and manipulating objects of different shape, size and color; and (2) and activities that can be performed with the objects. The activities can be designed to teach a learner a particular mathematical principle(s), such as fractions and geometric concepts. The activity generator can be a stand-alone device (analogous to a portable calculator), stored in CD-ROM or another storage media to be used on a stand-alone computer, retrievable program from the Internet, or a server, etc. The activities activity generator can be combined with textual content material, and other information, to build a system to provide instruction.

The means for generating, scaling and manipulating objects in a virtual environment can be routinely designed. The activities to be utilized within the virtual environment can be any type desired, e.g., mathematical, engineering, scientific (e.g., as development, paleontology, protein structure using amino acids, etc.). The activities can be devised from standard curriculum and textbook materials, actual problems, etc., and expressed in a textual content form.

Figure 3:
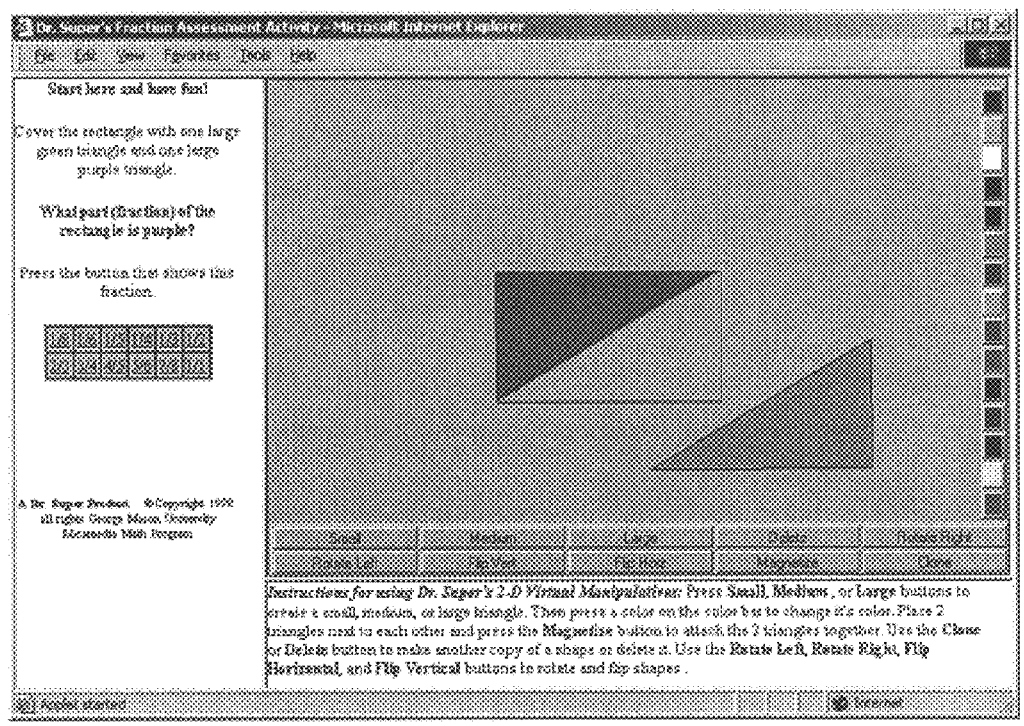
FIG. 3 shows a screen containing a problem (activity), a menu bar for performing operations, and a set of solutions for the problem.
Figure 4:
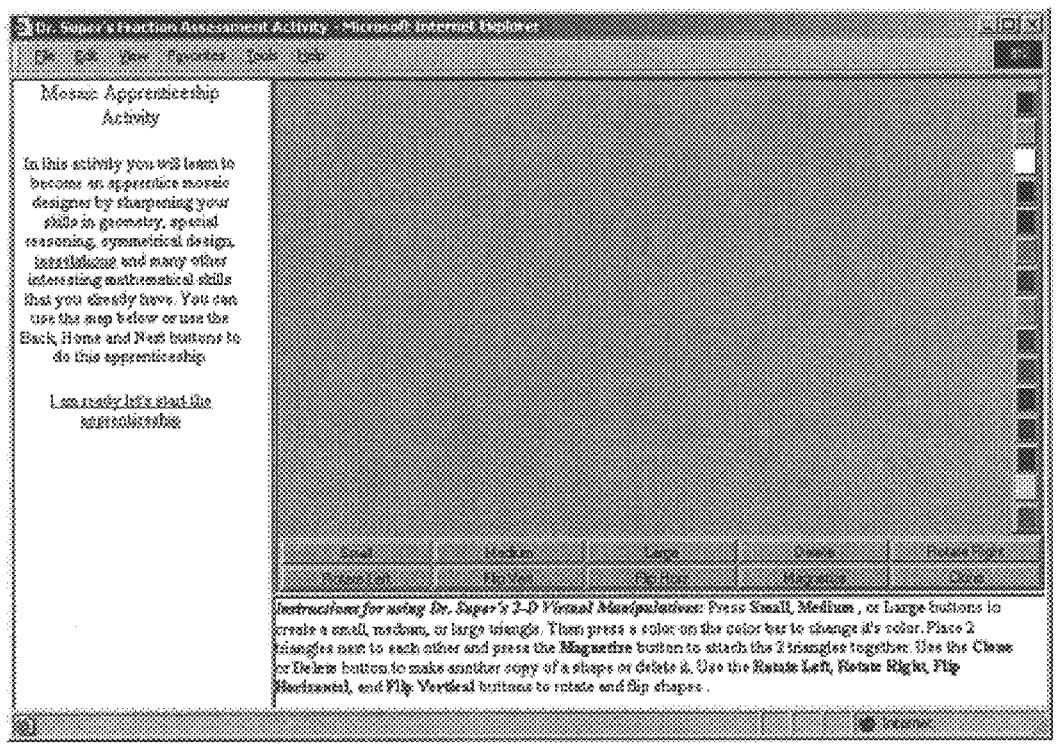
FIG. 4 shows a screen for performing three-dimensional activities with virtual manipulatives.

FIG. 3 illustrates an activity that can be performed in accordance with the presence invention, e.g., to teach fractions. As shown in FIG. 3, a learner can be provided with various units, such as: a guiding question or problem; virtual manipulatives to answer the question or problem; a menu bar comprising various operational tools (generating, scaling, moving, etc.); and a set of possible solutions, only one of which is correct. The activity can be designed as a set of pages or screens to provide a succession of steps in skill building.

In the example shown in FIG. 3, a large rectangle can be inert or it can be a "hot spot" designed to receive, evaluate, grade, monitor and/or transfer learner input. A learner is asked to cover the rectangle with one large green triangle and one large purple triangle. To perform the task, the learner selects the appropriate tool, from a menu bar, that enables him to execute the desired operation. The menu bar, displayed on the screen, can contain various operational tools, e.g., a means for generating and displaying triangles; a means for manipulating triangles (e.g., to rotate, to flip, to copy ro clone,: to group together or magnetize); and means for coloring triangles a desired color, comprising selecting a color from a palette of colors. Various tools and modes of operation can be used. For instance, a "rotate" operational tool can turn an object in various increments as desired, e.g., 10°, 20°, 30°, 45°, etc. The operation tools can be selected by the learner utilizing, e.g., a mouse, a series of keystrokes, touching the screen where such screen is pressure sensitive, speaking where voice recognition software is included, writing an answer where handwriting recognition software is included, etc. After the task is performed, the learner responds to a question ro problem related to it. In this example, a relevant question can be: "What part (fraction) of the rectangle is purple now?" The question can be displayed before or after the task is performed by the learner. The learner can identify the correct solution in a variety of ways as mentioned above, e.g., utilizing a mouse, by typing the correct answer in a designated position on the screen, voice recognition, etc. Learner input of a solution to the problem can result in immediate feedback and retrieval in which the learner is informed whether his answer is correct; if not, supplemental material and/or activities can be retrieved. The material and/or activities can provide the learner with the correct solution, and/or guide him in reaching the correct result, etc.

For instance, where a correct answer input is provided, a screen is retrieved which informs the learner that he has selected the right solution ("Good Job!"). Since this concept has been mastered, the learner can then be provided with another problem to retest the concept and/or reinforce it.

If an incorrect response is given by the learner, a selected text can be retrieved which explains the correct answer, e.g., "When a whole like the rectangle on the right is divided into equal parts you can ask what part of (fraction) it has a special property (like is it purple or green?). You can give the special answer as a special number called a fraction." Additionally, further examples can be provided to assist the learner in solving the problem.

Another aspect of the invention relates to a system for delivering, retrieving and monitoring instructional activities, preferably instructional activities utilizing virtual manipulatives. It can comprise (1) an activity base; (2) an activity template; (3) an "instructor" interface; (4) a "learner" interface; and/or (5) an activity analyzer. In a preferred embodiment, the system is Internet-based, e.g., using a Java, a Java-like language, or other computer language which permits it to be utilized with various operating system and browsers. As explained below, the system is comprised of various interconnected components, such as user interfaces, databases, performance monitors, etc.

The activity base (1) is analogous to a database for storing information, or references thereto, necessary to perform activities using virtual manipulatives. The activity base can contain, e.g., HTML documents, Java Applets, Form Objects, complete activities, URL, text, graphics, source code, multimedia files, sound files, Java code, etc. The activity base can store information directly, e.g., as a database, or it can provide addresses or locations from which information can be retrieved. It can, therefore, function wholly, or partly, as a look-up and grab table, retrieving information from selected locations. Text in the activity base (1) can include: problems ("What part of the rectangle is purple now?"), solutions, guiding information, explanations, links to Web sites, etc. The activity base also can contain (or directions thereto) Java Applets, and other computer source code, for generating and manipulating the virtual manipulatives which are used in combination with the HTML text. Form Objects, such as Edit boxes, Check boxes, Radio buttons, Drop downs, and means for inputting information, etc., can also be stored in retrievable form in the activity base (1). The activity base can be stored on a server which can be accessed, via the Internet, by a local user using an instructor interface (3). Thus, the activity base contains the information and tools useful to develop teaching activities.

An activity template (2) is another component which an be used with the instructional system. The activity template can be an interface wich is retrieved by an "instructor" using an instructor interface (3), enabling the "instructor" to create activities using virtual manipulatives for a class or curriculum. For instance, e activity template (2) can contain a plurality of fields into which an instructor can input information, such as information retrieved from the activity base (1), e.g., by creating links from the template to the activity base. The template also provides a "retrieve and display function" (e.g., a format assembler) which retrieves inputted information and displays it in organized format for presentation to a learner. See, e.g., Attachment 9 as an example. Thus, a learner can retrieve and display the organized and formatted template using the learner interface (4). A formatted template can be one or more activities. Attachment 9, for example could be created using an activity template (2).

The activity template can contain a plurality of fields, e.g., for inserting: (i) computer code, etc., for generating and manipulating objects (such as Attachment); (ii) a problem (such as the problem in FIG. 3); (iii) a set of solutions; (iv) a user interface input which receives solution input from the user; (v) textual content, e.g., explaining correct and incorrect solutions; (vi) links to other Internet sites. Information inserted into the template can be retrieved from the activity base (1), another source (e.g., a CD-ROM or an Internet site), or it can be created by the instructor. Once all the information inserted, the template cna be stored as a completed activity (locally or a centralized locating, such as in a completed template activity database or in the activity base (1)). A learned can be provided with a learner interface which allows him to select a completed activity created by the instructor using the activity template (2).

An activity template (2) can be provided to an instructor user in various forms. For example, it can contain an activity generator having a predetermined menu and set of exercises. In this case, the instructor user would only be required to select the exercises and insert them into the appropriate template field. The activity template (2) can also be written and stored in various languages and forms, e.g., ASP and CGI. The template can be obtained from the Internet, packaged as a CD-ROM, or from other storage means.

As mentioned, the activity template means can be utilized to d sign and create virtual manipulatives and activities associated with them. The activity template can be implemented as a source code which is stored in a data file on a server. In an especially preferred embodiment, the activity template comprises a manipulative design means and an activity design means. The manipulative design means and the activity design means can be separate source codes, each stored in separate data file. Typically, an instructor (or other user), when ready to use the activity template retrieves its source code from the storage means. Retrieval can be accomplished in any conventional manner, e.g., by clicking an activity template icon which contains a command or clicking a link on an HTML page. These events use the activity monitor to retrieve the appropriate activity and virtual manipulative.

The activity designer and the manipulative designer can be utilized and displayed at the same time, e.g., displayed as a screen which permits the instructor to design both manipulatives and activities, or, each can be utilized separately, e.g., where one screen corresponds to the activity designer and another screen corresponds to the manipulative designer. In either case, the activity template contains a means for linking the manipulative and activity together for future presentation to the student.

The virtual manipulative designer is preferably implemented in a source code, e.g., Visual Basic, C++ or Java, and other platform-independent codes. The virtual manipulative designer can have many of the same features and functionalities that represent in a typical paint or draw program. The operation of such features and functionalities are conventional.

The virtual manipulative designer can permit an instructor to set up a grid (regular or isometric grid) for drawing and creating any desired shape, design, or drawing. For example, an instructor can draw shapes on the grid by connecting points and closing the shapes. An instructor can also add fill color and change the boarders for this shape. The shape can then be saved to a particular shape bar that is retrievable by the learner interface (also called, the "activity monitor"). When a student selects a shape from the shape bar in the activity monitor this shape will appear and can be transformed by the tools on the Transformation bar. A picture of a version of the virtual manipulative designer is shown in FIG. 1 and a virtual manipulative and activity designer in FIG. 2. Note that these functionality's can be built directly into the designers as explained below.

Figure 2:
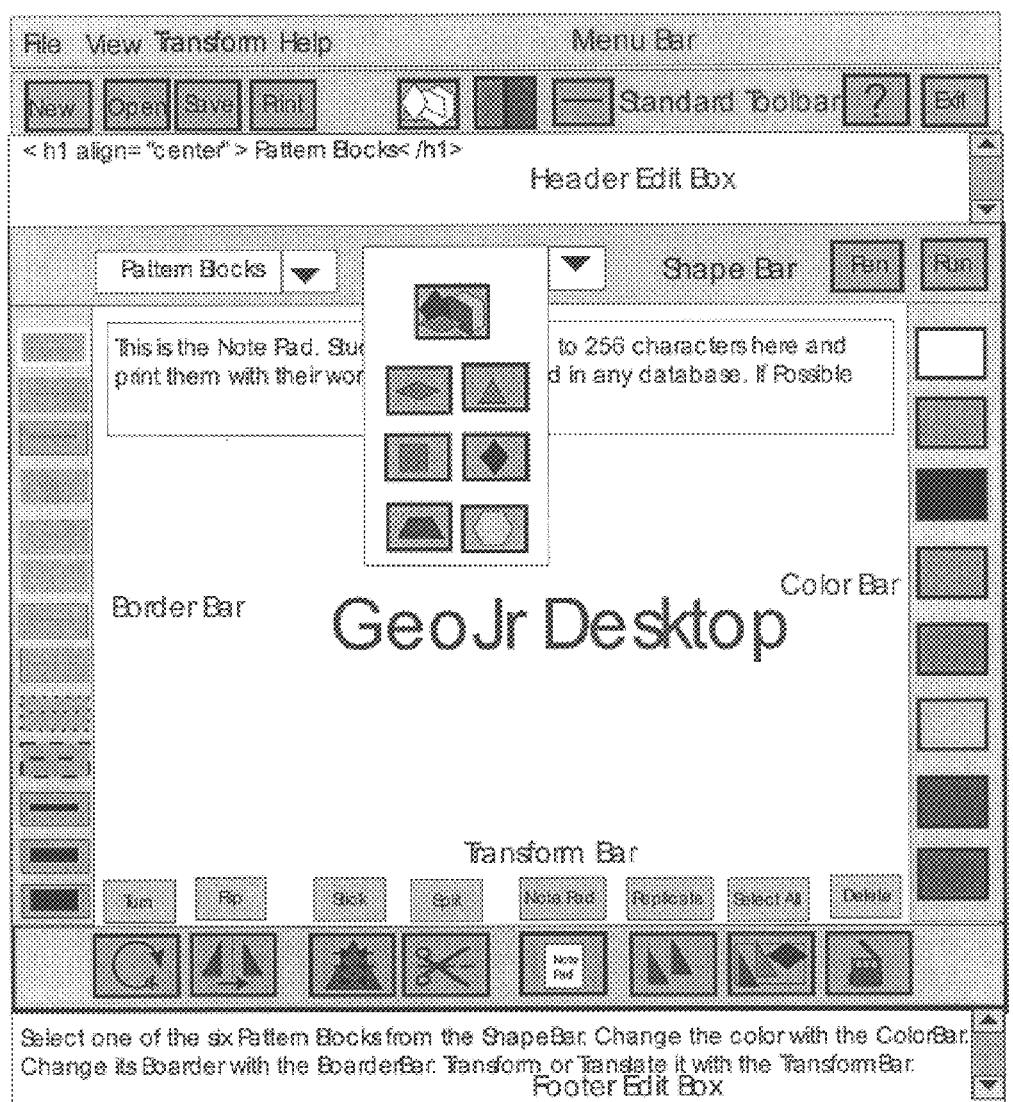
FIG. 2 shows a combine virtual manipulative and activity designer.

The virtual manipulative designer and activity designer as shown in FIG. 2 permits an instructor to select a virtual manipulative or a collection of shapes, format the viewing area by selecting the visible tool bars, create a background image, and create activities to be performed by a student. When the student accesses the file by the learner interface or activity monitor, the environment created by the instructor using the virtual manipulative and/or activity designer will be displayed to him.

The designer modules can contain various functionalities for creating manipulatives and activities. For example, the designer modules can contain a Title Bar, a Menu Bar, and the following tool bars: Kit and Shapes bar, Color bar, Border bar and Transform Bar. In addition, it can include a Header and Footer Edit box at the top and bottom of the application work space. Below is a description of the functionalities.

1. Title Bar. Shows the name of the module, e.g., Geo, Jr., and the activity identifier or file name. If the activity is not saved yet the Activity Name=UnTitled 2. Menu Bar. A menu bar can have one or more the following functionalities: File, View, Transform, and Help.
   i. File can contain typical file menu items.
      a. New. Opens a new document. Prompts for saving if the current activity is changed.
      b. Open. Retrieves and Opens dialog box for selecting a file to retrieve and display.
      c. Save. Saves the activity to the file from which it was retrieved.
      d. Save As. Retrieves a dialog box that permits the instructor to name and save the file to a designated storage means.
      e. Print. Retrieves a print dialog box that permits the instructor to print the screen.
      f. Run. Checkable item Places user in Run Module. The run module is the activity monitor or learner interface that allows a student to use the manipulatives in performing an activity.
      g. Design. Checkable item Places user in Design Module, either the virtual manipulative and/or the activity designer.
      h. Exit. Closes application brings up "Save As" if the file has been changed.
   ii. View. A functionality that allows the instructor to change the viewing area for both the design and run modules. Various functionalities can be retrieved.
      a. Standard Toolbar. Checkable item to show or hide the "Standard toolbar."
      b. Kits and Shape Bar. Checkable item to show or hide the "Kits and Shapes toolbar."
      c. Color Bar. Checkable item to show or hide the "Color bar."
      d. Border Bar. Checkable item to show or hide the "Border toolbar"
      e. Header. Checkable item to show or hide the Header Edit Box
      f. Footer. Checkable item to show or hide the Footer Edit Box
      g. Background Image. Open Dialog box where an image can be placed in the background
      h. Options. Viewing options are set in this box: The width and height of the virtual manipulative, Default Color, Default Border, colors for the Color Bar, and the borders for the Border Bar
   iii. Transform. Contains various functionalities that enable the instructor to transform the displayed shape or design. Features include, e.g.:
      a. Turn. Turns by the unit of rotation angle. The unit of rotation angle is specified in the Options. The center of rotation is the center of Gravity. The center of rotation for Turn Left and Turn Right can be the center mass $(xg,yg)=[(x1+x2+x3)/3,(y1+y2+y3)/3)]$. Turn Right and Turn left are respectively a rotation of $-Q$ or $Q$ centered at $(xg,yg)$. Turn Left: $x1=xg+ dcos(tan-1((y-yg)/(x-xg)+Q)$; $y1=yg+dsin(tan-1 ((y-yg)/(x-xg)+Q)$. Turn Right: $xr=xg+dcos(tan-1 ((y-yg)/(x-xg)-Q)$; $yr=yg+dsin(tan-1((y-yg)/(x-xg)-Q)$ Where d is the distance between $(xg.yg)$ and $(x,y)$
      b. Flip. Flips the object with the axis of reflection a horizontal axis passing through the center of gravity. Flip Side: $(x,y) \rightarrow (x,2yg-y)$
      c. Stick. Attaches a shape to an adjacent shape. It will attach many objects if they all share a common side, e.g., along a congruent and adjacent side.
      d. Split. Splits the shape into separate shapes.
      e. Replicate. Duplicates the selected shape
      f. Select All. Selects all the shapes on the desk top
      g. Delete. Deletes the selected shape
      h. Preferences. Opens a dialog box for specifying the Scale parameter(s), Unit Angle of Rotation, Center of Rotation, Horizontal and Vertical Axis of Reflection.
   iv. Help. Provides on-line help and tutorial 3. Transform bar.

4. Standard Toolbar. A standard tool bar can have various functionalities. For example, it can have the following tools: New, Open, Save, Print, Shape Bar Toggle, Color Bar Toggle, Border Bar Toggle, 5. Shape Bar. In Design Mode, the Shape Bar has a Kits dropdown and a Shapes Dropdown. It also has a Pen Tool and a Run Toggle. In Run Mode the Shapes are displayed on top as tools. If the Shapes are more than 10 then there is the drop down. There is also a Design Toggle.
   i. Kits Dropdown. Kits Dropdown contains all virtual manipulative kits that have been created and stored in the activity base. Each kit can be defined by a kit file where the syntax is similar to the shp files that is saved by the manipulative designer. For instance, the following kits can be listed in the Kits Dropdown: All Shapes, Attribute Blocks, Color Tiles, Dr. Super's Triangles, Pattern Blocks, Tangrams, Trigrams, 3-D Tiles. Geo Tiles.

ii. Shapes Dropdown. The Shapes drop down can display all the shapes in a Kit. It can also include one tool for all the shapes in the kit. It will render small versions automatically from the shp file for the File.

iii. Pen Tool. Can be used for freehand or stylized drawing.

iv. Design/Run Toggle. A toggle for changing between design and run modules.

6. Color Bar. Displays colors that can be used to form and fill the shapes. The colors on the color bar can be chosen in the options item in the view.

7. Border Bar. Displays borders (e.g., thickness of line, dotted line, etc) and border colors. The borders on the color bar can be chosen in the options item in the view.

8. Header and Footer Edit Boxes. Headers and Footers are areas where the instructor can enter text for an activity. In the first version this text can be formatted using HTML for the Run time version and the HTML version. These text will be respectively displayed in the first and third cells of a table with one column where a virtual manipulative is displayed in the middle cell.

i. Header Edit Box. Instructors can enter as much text as they want here. HTML can be used to format the text and change the font. This text will be displayed as the header in the HTML file.

ii. Footer Edit Box. Instructors can enter as much text as they want here. HTML can be used to format the text and change the font. This text will be displayed as the footer in the HTML file.

9. Status Bar. Writes into the browser's status bar the last action that was taken.

An instructor interface (3) and a learner interface (4) are the means by which the instructor and learner obtain access to the template and completed activities, respectively. Thus, in one embodiment, an instructor logs in at an Internet site which results in the retrieval and display of an instructor (3) interface providing the means for performing various applications, e.g., to retrieve an activity template to build an activity, to monitor a learner's performance, to retrieve a completed activity and perform it, to send e-mail, etc. Similarly, log-in by a learner results in the retrieval and display of a learner interface (4) which enables the learner, e.g., to retrieve completed activities, monitor his own performance, navigate to other Web sites, etc.

An Activity Analyzer (4) is another component that can be utilized with the system. It can act as a performance monitor, permitting an instructor to collect information on learner activity and learner to monitor his own performance. For instance, solution information inputted by a learner can be stored in an activity analyzer database that can be assessed by an instructor user, enabling the instructor to evaluate how the learners are progressing through the material and their success and failure in doing so. The Activity Analyzer (3) can contain various programs which analyze and assess performance, and display it to instructors/learners in any desired format. For instance, the analyzer can perform and display statistics regarding one or more learners' performance, analyze and display various desired parameters relating to a learner's and/or instructor's use of the system.

Virtual manipulatives can be utilized in any environment. For instance, virtual reality environments can be created using, e..g, VRML, which permit users to navigate in three-dimensional imaginary worlds. Such interfaces permit the instructor and learner to become totally immersed in the environment, enhancing the teaching and learning experience. Interfacing with the virtual manipulatives in a virtual reality environment can be performed using a mouse, a joystick, a dexterous hand, etc. They ca be displayed on computer screens, on head-mounted displays, etc.

Figure 5:
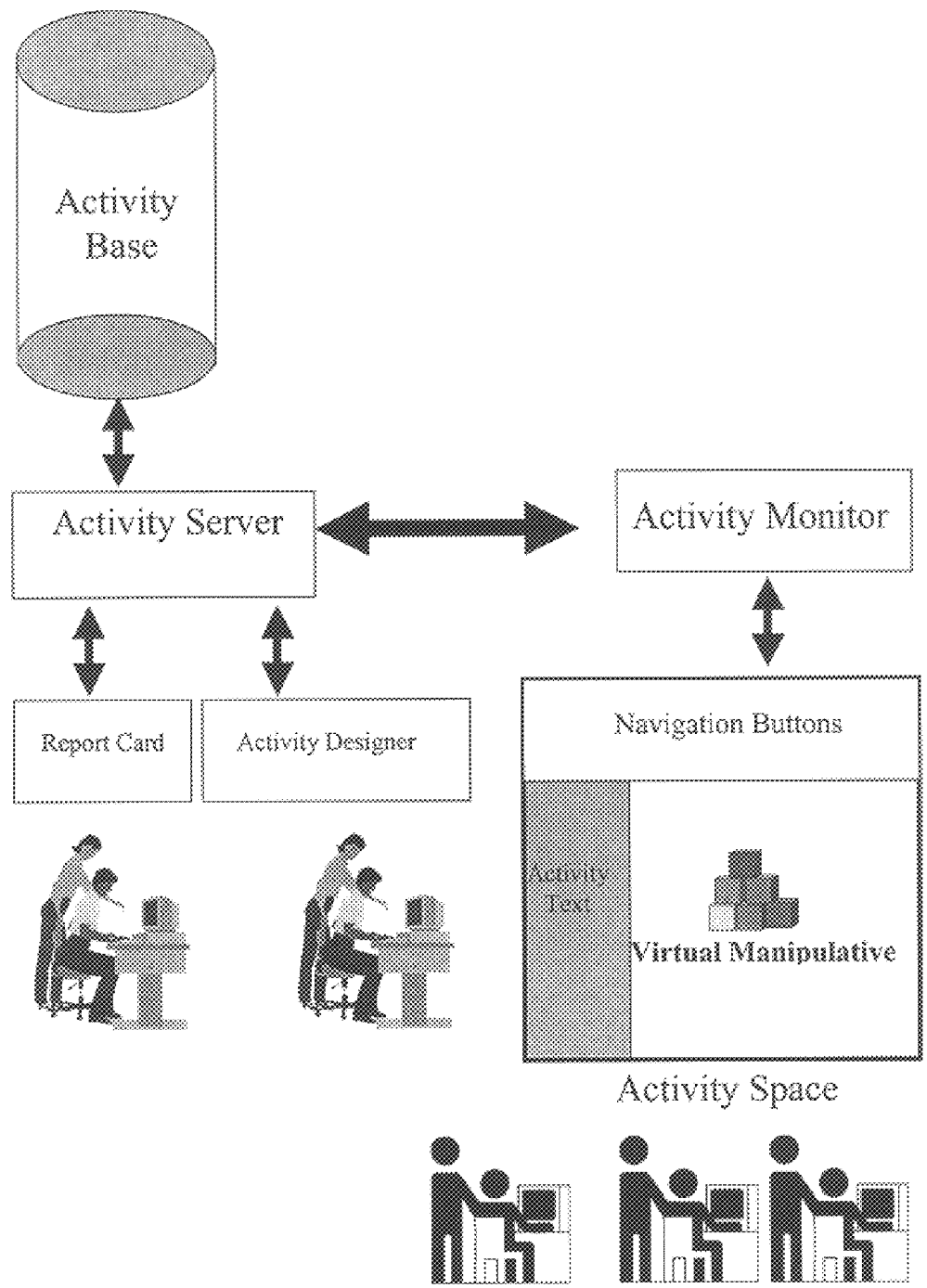
FIG. 5 is a schematic of components of an Activity Server.

FIG. 5 shows various components of a system in accordance with the present invention, e.g., an activity base, an activity, server, an activity monitor, a report card, an activity designer, and an activity space. The activity base is a storage database for all the components of an activity including all the virtual manipulatives and inputs. The activity server is, e.g., a computer module which communicates with the components in the system. The Activity designer (see above) is a tool used by curriculum designers to create and edit activities. An activity created by the Activity designer is called an Activity space and it is stored in the Activity base, and is accessed via the Activity server. Activity monitor is a tool that can be used to publish an Activity space, e.g., on the Internet or Intranet, and record the student interactions with it. A Report Card module can permit instructors to assess students' work and create reports of it.

The methods described herein can be performed, e.g., as described in the attachments. Other means-for and method can also be utilized, e.g., see U.S. Pat. Nos. 5,115,494; 5,325,472; *Interactive Computer Graphics in X*, by T. Pavlidis, PWS Publishing Co., 1996; *Jim Blinn's Corner: A Trip Down the Graphic Pipeline*, by Jim Blinn, Morgan Kaufmann Publisher, 1996; *Advanced Graphics Programming Using C/C++*, by L. Heiny, John Wiley & Sons, 1993; *Computer Graphics and Geometric Modeling for Engineers*, by V. R. Anand, John Wiley & Sons, 1993; *Advanced Graphics on VGA and XGA Cards using Borland C++*, by I. O. Angell and D. Tsoubelis, Halsted Press, 1992.

The following is Java source code in which a preferred embodiment of the invention is implemented.

Called From: (None)

Calls To: FactorBlockGenerator( )

Purpose: The purpose of this class is to act as a liaison between all classes involved in FactorBlock processing This applet is the main class.

```
*/
import java.awt.*;
import java.applet.*;
import java.awt.event.*;
import java.lang.*;
import java.util.Vector;
import vrml.external.field.*;
import vrml.external.Node;
import vrml.external.Browser;
import vrml.external.exception.*;
public class FactorBlockControl extends Applet {
    float [ ] currentpos={0,0,0};
    //private static final int MAXELEMENTS=13;
        //Maximum length for the vector into which factor-
        blocks will go.
    private static final int MAXELEMENTS=50;
        //Maximum length for the vector into which factor-
        blocks will go.
    public Browser browser;
    public FactorPad factorpad;
```

```
public Node nderoot;
public FactorBlockTracker blocktracker;
public static final int ALL=0;
public static final int XYZ=1;
public boolean blocksetenabled;
// EventIns of the root node
EventInMFNode addChildren;
EventInMFNode removeChildren;
//EventOuts of the root node
EventOutSFTime touchTime=null;
//Keep factorblock in a Vector
Vector addedBlocks;
int topIndex;
FactorBlockWrapper curClump; //Current factorblock
    we're editing
static int transformRange=40;
private FactorBlockGenerator fbg=new
    FactorBlockGenerator( );
public AudioClip[ ] clip=new AudioClip[5];
public String fbmaker_color; //string that is passed
    into FactorBlockGenerator
int fbcolor; //determines the color of the block
//Initialize the applet.
public void init( ){
    this.setLayout(new BorderLayout( ));
        //Load sound file
        try {
        clip[0]=getAudioClip(getDocumentBase(
            ),"thump.au");
        clip[1]=getAudioClip(getDocumentBase(
            ),"drip.au");
        clip[2]=getAudioClip(getDocumentBase(
            ),"TypeKey.au");
        clip[3]=getAudioClip(getDocumentBase(
            ),"pop.au");
        clip[4]=getAudioClip(getDocumentBase(
            ),"magic.au");
        }
        catch(NegativeArraySizeException
            e){System.out.println("Sound can not load");}
}
//Initialize the applet.
public void start( ){
    factorpad=new FactorPad( ); //Create a factorpad.
    this.setBackground(Color.lightGray); //sets the
        background color of the applet.
        this.add(factorpad,"Center"); //Add factorpad to
            the applet window.
        blocktracker=new FactorBlockTracker(this,
            factorpad);
        addedBlocks=new Vector(MAXELEMENTS);
            //Create a block array.
        topIndex=-1;
        browser=Browser.getBrowser(this); //Get
            instance of this browser.
        //Get the "ROOT" node (a Group which we add
            some children to)
        //Make a reference to the "ROOT" node in vrml
            scence. Children will then be
        //added and removed from this node.
        try
        {
        nderoot=browser.getNode("ROOT");
        }
        catch(InvalidNodeException e)
        {
        die("initScene: ROOT node not found!");
            return;
        }
        // Get the type of the ROOT node
        String root_node_type=nderoot.getType( );
        System.out.println("The node is of type"+root_
            node_type+".");
        if (!root_node_type.equals("Root")){
            System.out.println("WARNING! initScene:
                ROOT node (type '"+root_node_type+"')"+
                "is not a 'Group'!");
        }
        // Hang on to the root_node pointer so other meth-
            ods can use it . . .
        try {
            //Get an instance of the addChildren field.
            addChildren=(EventInMFNode)
                nderoot.getEventIn("addChildren");
            //Get an instance of the removeChildren field.
            removeChildren=(EventInMFNode)
                nderoot.getEventIn("removeChildren");
        }
        catch (InvalidEventInException e){
            die("start: InvalidEventInException"+e);
            return;
        }
    super.start( );
    FactorBlockEventListener listener=new
        FactorBlockEventListener(this, factorpad);
    //Add Listeners
    factorpad.btnmakeblock.addActionListener(listener);
        factorpad.btnmakeblockset.addActionListener
            (listener);
        factorpad.btnremoveblock.addActionListener
            (listener);
        factorpad.btnremoveall.addActionListener(listener);
        factorpad.btnsnapfront.addActionListener(listener);
            factorpad.btnsnaptop.addActionListener(listener);
            factorpad.btnsnapside.addActionListener(listener);
            factorpad.btnrotatefront.addActionListener
                (listener);
            factorpad.btnrotatetop.addActionListener(listener);
            factorpad.btnrotateside.addActionListener(listener);
            factorpad.addMouseListener(listener);
}//end Start
public void stop( ){
    System.out.println("FactorBlockControl: stop( ) . . . ");
}
public void destroy( ){
    System.out.println("FactorBlockControl: destroy( ) . . .
        ");
}
public void die(String s){
    System.out.println("FactorBlockControl: FATAL
        ERROR!");
    System.out.println("-->"+s);
    System.out.println("FactorBlockControl: Aborting . . .
        \n");
}
//Return the current browser instance.
public Browser getBrowser( ){
    return browser;
}
// Select a FactorBlock when clicked.
public void makeCurrent(FactorBlockWrapper which){
    curClump=which;
```

```
    blocktracker.trackBlock(curClump);
    if (blocktracker.initattach=true)
    {
        blocktracker.attachblocks(curClump);
            factorpad.btnsnapfront.setEnabled(true);
            factorpad.btnsnaptop.setEnabled(true);
            factorpad.btnsnapside.setEnabled(true);
    }
}
//Add a blockset. Call addblock 13 times with blocks in
    different positions
//on the block rest.
public void addblockset( )
{
//Clear text fields on factorpad clearfactorpadfields
    (XYZ);
//Add blocks on first row.
    addblock(1,1,1,-85.000,140.000);
    curClump.byblockset=true;
    addblock(1,2,1,-75.000,140.000);
    curClump.byblockset=true;
    addblock(3,1,1,-65.000,140.000);
    curClump.byblockset=true;
//Add blocks to second rows.
    addblock(1,5,1,-85.000,110.000);
    curClump.byblockset=true;
    addblock(3,2,1,-75.000,125.000);
    curClump.byblockset=true;
    addblock(2,2,2,-55.000,125.000);
    curClump.byblockset=true;
//Add blocks to second and third rows.
    addblock(2,5,1,-85.000,80.000);
    curClump.byblockset=true;
    addblock(3,2,2,-74.000,110.000);
    curClump.byblockset=true;
    addblock(2,2,5,-55.000,110.000);
    curClump.byblockset=true;
//Add blocks to fourth row
    addblock(3,3,1,-74.000,90.000);
    curClump.byblockset=true;
    addblock(2,2,1,-55.000,90.000);
    curClump.byblockset=true;
    addblock(3,5,1,-90.000,50.000);
    curClump.byblockset=true;
//Add last block to the bottom.
    addblock(5,5,1,-70.000,60.000);
        curClump.byblockset=true;
        //clear volume field.
        factorpad.txtresult.setText(" ");
        //post a request to the Java Environment to Collect
            all objects without references.
}
public void addblock(double horpos, double verpos){
    this.addblock(0,0,0,horpos,verpos);
}
//Adds a factorblock to the target VRML scene.
//length=horizontal, width=vertical into the scene,
    height=blocks built from ground up.
    public void addblock(int x,int z, int y,double horpos,
        double verpos){
    FactorBlockWrapper newClump=null;//Define another
        FactorBlockWrapper and initialize to null
    int intresult=0; //Define temporary multiplier.
    String strresult=" ";
    String strblockspec=" ";
    //Reassign x,y,z with values coming from the Factor-
        Pad.
    if(x=0 && y=0 && z=0)
    {
    //Get values from the factorpad.
        x=Integer.parseInt(factorpad.txtxinput.getText( ));
        z=Integer.parseInt(factorpad.txtzinput.getText( ));
        y=Integer.parseInt(factorpad.txtyinput.getText( ));
    }
//If block dimensions are greater than 5 then do not create
    block.
    if (x>10||y>10||z>10)
    {
        System.out.println("Value to large");
    }
    else
    {
        //Insert volume
            intresult=(x*y*z);
            strresult String.valueOf(intresult);
            factorpad.txtresult.setText(strresult);
            //determines block color
            if(factorpad.colorpick=factorpad.GREEN)
            {
                fbmaker_color="\"greenwrap.gif\" ";
                fbcolor=factorpad.GREEN;
            }
            else if (factorpad.colorpick=factorpad.BLUE)
            {
            fbmaker_color="\"bluewrap.gif\" ";
            fbcolor=factorpad.BLUE;
            }
            else if (factorpad.colorpick=factorpad.RED)
            {
            fbmaker_color="\"redwrap.gif\" ";
            fbcolor=factorpad.RED;
            }
            //Assign generated block specification from Factor-
                BlockGenerator.
            strblockspec=fbg.createBlock(x,z,y,horpos,verpos,
                fbmaker_color);
        //System.out.println(" "+strblockspec);
            //Call the factorblock encapsulation class.
                new Clump=new
    FactorBlockWrapper(this,strblockspec,
    FactorBlockWrapper.FACTORBLOCK);
    if (newClump=null)
    System.out.println("newClump=null");
        // Add this factorblock to the end of the vector.
        // We really only do this to protect the factorblocks.
        // from Java's garbage collector
        addedBlocks.addElement(newClump.transArray[0]);
        //System.out.println("Added Elements size"+
            addedBlocks.size( ));
        // Increment the index of the high element
        topIndex++;
        //Make the new factorblock the current factorblock.
        curClump=newClump;
            curClump.mycolor=fbcolor;
        // Add clump to the scene graph
        try{
            EventInMFNode addChildren=(EventInMFNode)
                nderoot.getEventIn("addChildren");
        addChildren.setValue(curClump.transArray);
        }
```

```
    catch (InvalidEventInException e){
       System.out.println("PROBLEMS!: "+e);
    }
    clip[0].play( );
  } //end Else
} //End addBlock
//remove selected block
public void removeblock( ){
    //Removes the current block identified by the touch-
       Sensor.
    if (curClump !=null){
    removeChildren.setValue(curClump.transArray);
       //removes block from vrml
         addedBlocks.removeElement
           (curClump.transArray[0]); //remove element
           from vector
       System.gc( );
       clearfactorpadfields(ALL);
       clip[3].play( );
       System.out.println("added     blocks:
         "+addedBlocks.size( ));
    }
}
//removes all the block from the scene.
public void removeAllblocks( ){
    //Creates a new node the size of the Vector containing
       the total block number.
    Node[ ] nodes=new Node[addedBlocks.size( )];
    //Clear factorpad text fields.
       clearfactorpadfields(ALL);
    for (int i=0; i<addedblocks.size( ); i++){
       //Assign to the new node object block elments from
         the Vector.
         nodes[i]=(Node) addedBlocks.elementAt(i);
         //System.out.println("i"+addedBlocks.elementAt
           (i));
    }
       //Remove the blocks from the scene.
    removeChildren.setValue(nodes);
    //System.out.println("Removed children");
    //Remove all elements from the Vector.
    addedBlocks.removeAllElements( );
    System.gc( );
    clip[2].play( );
}// end removeblocks
public void clearfactorpadfields(int textfields)
{
  switch (textfields)
  {
    case (ALL):
       factorpad.txtxinput.setText(" ");
       factorpad.txtyinput.setText(" ");
  factorpad.txtzinput.setText(" ");
       factorpad.txtresult.setText(" ");
       break;
    case (XYZ):
       factorpad.txtxinput.setText(" ");
       factorpad.txtyinput.setText(" ");
  factorpad.txtzinput.setText(" ");
       break;
  }//end switch
}
     }//end FactorBlockControl
Called From: FactorBlockControl
Call To: (None)
*/
import java.awt.event.*;
import java.awt.*;
import vrml.external.Browser;
public class FactorBlockEventListener implements
    ActionListener,MouseListener {
FactorBlockControl fbc;
FactorPad fp;
Browser browser;
public FactorBlockEventListener(FactorBlockControl
    fbc, FactorPad fp)
    {
    this.fbc=fbc; //copy FactorBlockControl reference
    browser=fbc.getBrowser( ); //reference
    this.fp=fp; //copy FactorPad reference
  }
//ActionListener method
  public void actionPerformed(ActionEvent ae){
    Object obj=ae.getSource( );
    if (obj instanceof Button)
    {
       if (obj=fp.btnmakeblock){
         fbc.addblock(-70.000,130.0);
         fp.setEnableButtons(fp.ALLON);
    }
       else if (obj=fp.btnmakeblockset){
         fp.setEnableButtons(fp.ALLOFF);
         fbc.addblockset( );
         fp.setEnableButtons(fp.ALLON);
         fbc.blocksetenabled=true;
    }
       else if (obj=fp.btnremoveblock){
         fbc.removeblock( );
         if (fbc.addedBlocks.size( )=0){
         fp.setEnableButtons(fp.INIT);
       }
    }
    else if (obj=fp.btnremoveall){
       fbc.removeAllblocks( );
       fp.setEnableButtons(fp.INIT);
       fbc.blocksetenabled=false;
    }
    else if (obj=fp.btnsnapfront){
         fbc.blocktracker.snapdirection=
           fbc.blocktracker.FB_SNAPFRONT;
         fbc.blocktracker.initBlockAttach( );
         fp.btnsnaptop.setEnabled(false);
         fp.btnsnapside.setEnabled(false);
    }
       else if (obj=fp.btnsnaptop){
           fbc.blocktracker.snapdirection=
             fbc.blocktracker.FB_SNAPTOP;
         fbc.blocktracker.initBlockAttach( );
           fp.btnsnapfront.setEnabled(false);
           fp.btnsnapside.setEnabled(false);
    }
    else if (obj=fp.btnsnapside){
         fbc.blocktracker.snapdirection=
           fbc.blocktracker.FB_SNAPSIDE;
         fbc.blocktracker.initBlockAttach( );
         fp.btnsnapfront.setEnabled(false);
         fp.btnsnaptop.setEnabled(false);
         // fbc.clip[4].play( );
    }
```

```
        else if (obj=fp.btnrotatefront){
            fbc.blocktracker.rotateBlock(fbc.curClump,
                fbc.blocktracker.ROTATE_FRONT);
            fbc.clip[4].play( );
        }
        else if (obj=fp.btnrotatetop){
            fbc.blocktracker.rotateBlock(fbc.curClump,
                fbc.blocktracker.ROTATE_TOP);
            fbc.clip[4].play( );
        }
        else if (obj=fp.btnrotateside){
            System.out.println("rotateside_event");
            fbc.blocktracker.rotateBlock(fbc.curClump,
                fbc.blocktracker.ROTATE_SIDE);
            fbc.clip[4].play( );
        }
    }
}
public void mouseDragged(MouseEvent e){
}
public void mouseMoved(MouseEvent e){
}
public void mousePressed(MouseEvent e){
    int x=e.getX( );
    int y=e.getY( );
    e.consume( );
    if((x>5 && x<95) && (y>105 && y<125))
    {
        fp.colorpick=fp.BLUE;
        fp.repaint( );
    }
    else if ((x>100 && x<190) && (y>105 && y<125))
    {
        fp.colorpick=fp.RED;
        fp.repaint( );
    }
    else if((x>195 && x<285) && (y>105 && y<125)) {
        fp.colorpick=fp.GREEN;
        fp.repaint( );
    }
}
public void mouseReleased(MouseEvent e){
}
public void mouseEntered(MouseEvent e){
}
public void mouseExited(MouseEvent e){
}
public void mouseClicked(MouseEvent e){
}
}
Calls To: (None)
Calls From: FactorCity.java
Purpose: The purpose of the BlockGenerator class is to
    generate blocks into a scene when passed numeric
    parameters.
The createblock method takes integers representing
length X width X height and creates a
    block representing this.
*/
import java.awt.*;
import java.applet.*;
import vrml.external.field.*;
import vrml.external.Node;
import vrml.external.Browser;
import vrml.external.exception.*;
public class FactorBlockGenerator {
//get the Factor Block Number and the node to add the
    blocks.
public FactorBlockGenerator( )
{
    //No initialization
}
public String createBlock(int intxnum, int intynum, int
    intznum, double dbxval, double dbyval, String fbcolor)
{
    double dbxvalinit=0;
    double dbyvalinit=0;
    double dbzval=0;
    String strxtranslation=" ";
    String strytranslation=" ";
    String strztranslation=" ";
    String strfblock;
    int firstrow=0;
    dbyvalinit=(float) dbyval;
    dbzval=8.200;
    strfblock=" "
    for (int x=0; x<intxnum; ++x)
    {
        dbxval=dbxval+5.200;
        strxtranslation=dbxval+" "+dbyvalinit+"8.200\n";
        strfblock=strfblock+
            "Transform {\n"+
            "children Shape {\n"+
            "appearance Appearance {\n"+
            "material Material {\n"+
            "diffuseColor 0.0 1.0 0.0\n"+
    "}\n"+
            "texture ImageTexture {\n"+
            "url "+fbcolor+"\n"+
            "}\n"+
            "}\n"+
            "geometry Box {size 5 5 5}\n"+
            "}\n"+
            "translation"+strxtranslation+
            "}, \n";
    //If the height was entered then build the block height on
        the first row.
    if (x<intxnum)
    {
        for(int z=0;z<(intznum−1); ++z)
        {
            dbzval=dbzval+5.200;
            strztranslation=dbxval+" "+dbyvalinit+" "+dbzval+
                "\n";
            strfblock=strfblock+
                "Transform {\n"+
                "children Shape {\n"+
                "appearance Appearance {\n"+
                "material Material {\n"+
                "diffuseColor 0.0 1.0 0.0\n"+
                "☆\n"+
                "texture ImageTexture {\n"+
                "url"+fbcolor+"\n"+
                "}\n"+
                "}\n"+
```

```
            "geometry Box {size 5 5 5}\n"+
            "}\n"+
            "translation"+strztranslation+
            "},\n";
        }//end z
        dbzval=8.200;
        }//end if
    for(int y=0; y<(intynum-1); ++y)
    }
        dbyval=dbyval+5.200;
            strytranslation=dbxval+" "+dbyval+"8.200\n";
        strfblock=strfblock+
            "Transform {\n"+
                "children Shape {(\n"+
                    "appearance Appearance {\n"+
                        "material Material {\n"+
                            "diffuseColor 0.0 1.0 0.0\n"+
                        texture ImageTexture {\n"+
                            "url"+fbcolor+"\n"+
                        "}\n"+
                    "}\n"+
                    geometry Box {size 5 5 5}\n"+
                "}\n"+
                "translation"+strytranslation+
                "},\n";
        for(int z=0;z<(intznum-1); ++z)
        {
            dbzval=dbzval+5.200;
            strztranslation=dbxval+" "+dbyval+" "+dbzval+
                "\n";
            strfblock=strfblock+
                "Transform {\n"+
                    "children Shape {\n"+
                        "appearance Appearance {\n"+
                            "material Material {\n"+
                                "diffuseColor 0.0 1.0 0.0\n"+
                            "}\n"+
                            "texture ImageTexture {\n"+
                                "url"+fbcolor+"\n"+
                            "}\n"+
                        "}\n"+
                        "geometry Box {size 5 5 5}\n"+
                    "}\n"+
                    "translation"+strztranslation+
                    "},\n";
        }//end z
        dbzval=8.200;
        }//end y
    dbyval=dbyvalinit;
    }//end x
    String str_xyz=intxnum+"X"+intynum+"X"+intznum;
        strfblock="DEF BLOCK"+str_xyz+Transform {\n"+
            "children[\n"+
                strfblock+"\n"+
            "]\n"+
        "}\n";
        return strfblock.trim( );
    }//end createBlock
}//end class
Called From: FactorBlockControl
Call To: (None)
*/
import java.awt.event.*;
importjava.awt.*;
import vrml.external.Browser;
import vrml.external.field.*;
import vrml.external.Node;
import vrml.external.Browser;
import vrml.external.exception.*;
public class FactorBlockTracker {
    //Instance constants and variables
    private static final int plot3x2=6;
    private static final int plot3x3=9;
    private static final int plot1x2=2;
    private static final int plot2x2=4;
    private static final int plot2x2x1=4;
    private static final int plot2x2x2=8;
    private static final int plot2x2x5=20;
    private static final int plot2x5=10;
    private static final int plot5x5=25;
    private static final int plot1x1=1;
    private static final int plot3x1=3;
    private static final int plot1x5=5;
    private static final int plot3x5=15;
    private static final int xpos=0;
    private static final int ypos=1;
    private static final int zpos=2;
    static final int ROTATE_FRONT=0;
    static final int ROTATE_TOP=1;
    static final int ROTATE_SIDE=2;
    private Browser browser;
    private FactorBlockWrapper fbw;
    private FactorBlockWrapper fbwAttach;
    private FactorBlockControl fbc;
    private FactorPad fp;
    private float conxval;
    private float conyval;
    public static final int VAL_NOMATCH=0;
    public static final int FB_SNAPSIDE=1;
    public static final int FB_SNAPFRONT=2;
    public static final int FB_SNAPTOP=3;
    public float[ ] blockpos={0,0,0};
    public float[ ] attachpos;
    public boolean initattach;
    public int snapdirection; //stores snap direction for two
        blocks
    public FactorBlockTracker(FactorBlockControl fbc,
        FactorPad fp) {
        this.fbc=fbc; //get permanent class reference to Fac-
            torBlockControl
        browser=fbc.getBrowser( ); //get reference to the
            browser
            this.fp=fp; //get permanent class reference to the
                FactorPad
    }
    public void trackBlock(FactorBlockWrapper fbw)
    {
        //declare snap values
            float[ ]snapvalue=new float[3];
        this.fbw=fbw;
        blockpos=fbw.translation_changed.getValue( );
        System.out.println("x:"+blockpos[0]);
        System.out.println("y:"+blockpos[1]);
        System.out.println("z:"+blockpos[2]);
        switch (fbw.intfb_xy)
        {
            case(plot3x2):
            if (fbw.intfb_xyz>fbw.intfb_13xy)
            }
                conxval=4.964882f;
                conyval=20.326118f;
            }
```

```
        else
      }
        conxval=4.964886f;
        conyval=4.961822f;
      }
      if(fbw.byblockset=true)
   {
      blockpos[xpos]=blockpos[xpos]–conxval;
        blockpos[ypos]=blockpos[ypos]–conyval;
   }
   if((blockpos[xpos]>=41 && blockpos[xpos]<=52) &&
      (blockpos[ypos]>=2 && blockpos[ypos]<=9))
   {
      if(fbw.byblockset=true)
      {
        snapvalue[xpos]=46.763344f+conxval;
      snapvalue[ypos]=6.440262f+conyval;
      }
      else
      {
        snapvalue[xpos]=46.763344f;
      snapvalue[ypos]=6.440262f;
      }
        fbc.clip[1].play( );
        fbw.set_translation.setValue(snapvalue);
      fbw.lockFactorBlock( );
   }
}
break;
case(plot3×3):
   conxval=3.950935f;
   conyval=40.080253f;
   if(fbw.byblockset=true)
{
   blockpos[xpos]=blockpos[xpos]–conxval;
      blockpos[ypos]=blockpos[ypos]–conyval;
   }
   if((blockpos[xpos]>=43 && blockpos[xpos]<=51) &&
      (blockpos[ypos]>=–17 && blockpos[ypos]<=–11))
   {
      if(fbw.byblockset=true)
      {
        snapvalue[xpos]=47.133095f+conxval;
      snapvalue[ypos]=–13.867538f+conyval;
      {
      else
      {
        snapvalue[xpos]=47.133095f;
      snapvalue[ypos]=3.867538f;
      }
   fbw.set_translation.setValue(snapvalue);
   fbw.lockFactorBlock( );
      fbc.clip[1].play( );
   }
   break;
case(plot1×2):
   conxval=4.945915f;
   conyval=10.052293f;
   if(fbw.byblockset=true)
}
   blockpos[xpos]=blockpos[xpos]–conxval;
      blockpos[ypos]=blockpos[ypos]+conyval;
   }
   if((blockpos[xpos]>=40 && blockpos[xpos]<=44) &&
      (blockpos[ypos]>=–40 && blockpos[ypos]<=–35))
   }
      if(fbw.byblockset=true)
      {
        snapvalue[xpos]=42.418945f+conxval;
      snapvalue[ypos]=–38.5773f–conyval;
      }
      else
      {
        snapvalue[xpos]=42.418945f;
      snapvalue[ypos]=–38.5773f;
      }
   fbw.set_translation.setValue(snapvalue);
   fbw.lockFactorBlock( );
      fbc.clip[1].play( );
   }
   break;
case(plot2×2):
   if (fbw.byblockset=true)
{
   if (fbw.intfb_xyz=plot2×2×2)
   {
      conxval=14.861223f;
      conyval=–4.939546f;
        blockpos[xpos]=blockpos[xpos]+conxval;
        blockpos[ypos]=blockpos[ypos]+conyval;
   }
   else if (fbw.intfb_xyz=plot2×2×5)
   {
      conxval=14.749763f;
      conyval=–20.145776f;
        blockpos[xpos]=blockpos[xpos]+conxval;
        blockpos[ypos]=blockpos[ypos]+conyval;
   }
   else if (fbw.intfb_xyz plot2×2)
   {
      conxval=15.228513f;
      conyval=–40.835676f;
        blockpos[xpos]=blockpos[xpos]+conxval;
      blockpos[ypos]=blockpos[ypos]+conyval;
        System.out.println("This is it");
   }
}
   if((blockpos[xpos]>=48 && blockpos[xpos]<=55) &&
      (blockpos[ypos]>=–41 && blockpos[ypos]<=–36))
{
   if(fbw.byblockset=true && fbw.intfb_xyz=plot2×2×2)
   {
      snapvalue[xpos]=52.087463f–conxval;
   snapvalue[ypos]=–38.59311f–conyval;
   }
   else if(fbw.byblockset=true && fbw.intfb_xyz=plot2×
      2×5)
   {
      snapvalue[xpos]=52.087463f–conxval;
   snapvalue[ypos]=–38.59311f–conyval;
   }
   else if(fbw.byblockset=true && fbw.intfb_xyz=plot2×
      2)
   {
      snapvalue[xpos]=52.087463f–conxval;
   snapvalue[ypos]=–38.59311f–conyval; }
   else
   {
      snapvalue[xpos]=52.087463f;
   snapvalue[ypos]=–38.59311f;
   }
   fbw.set_translation.setValue(snapvalue);
   fbw.lockFactorBlock( );
      fbc.clip[1].play( );
```

```
      }
      break;
   case(plot2x5):
      conxval=14.940693f;
      conyval=-49.966564f;
      if(fbw.byblockset=true)
{
      blockpos[xpos]=blockpos[xpos]-conxval;
         blockpos[ypos]=blockpos[ypos]+conyval;
      }
      if((blockpos[xpos]>=48 && blockpos[xpos]<=55) &&
         (blockpos[ypos]>=-73 && blockpos[ypos]<=-63))
      {
         if(fbw.byblockset=true)
         {
            snapvalue[xpos]=52.281097f+conxval;
            snapvalue[ypos]=-68.66943f-conyval;
         }
         else
         {
            snapvalue[xpos]=52.281097f;
            snapvalue[ypos]=-68.66943f;
         }
         fbw.set_translation.setValue(snapvalue);
         fbw.lockFactorBlock( );
            fbc.clip[1].play( );
      }
      break;
   case(plot5x5):
      conxval=.0127f;
      conyval=69.9464f;
      if(fbw.byblockset=true)
{
      blockpos[xpos]=blockpos[xpos]+conxval;
         blockpos[ypos]=blockpos[ypos]-conyval;
      }
      if((blockpos[xpos]>=84 && blockpos[xpos]<=91) &&
         (blockpos[ypos]>=-22 && blockpos[ypos]<=-11))
      {
         if(fbw.byblockset=true)
         {
            snapvalue[xpos]=87.22969f-conxval;
            snapvalue[ypos]=-14.457977f+conyval;
         }
         else
         {
            snapvalue[xpos]=87.22969f;
            snapvalue[ypos]=-14.457977f;
         }
         fbw.set_translation.setValue(snapvalue);
         fbw.lockFactorBlock( );
            fbc.clip[1].play( );
      }
      break;
   case(plot1x1):
      conxval 14.78186f;
      conyval=10.09091f;
      if(fbw.byblockset=true)
{
      blockpos[xpos]=blockpos[xpos]-conxval;
         blockpos[ypos]=blockpos[ypos]+conyval;
      }
      if((blockpos[xpos]>=83 && blockpos[xpos]<=89) &&
         (blockpos[ypos]>=-35 && blockpos[ypos] <=-3 1))
      {
         if(fbw.byblockset=true)
         {
            snapvalue[xpos]=87.54475f+conxval;
            snapvalue[ypos]=-33.4059f-conyval;
         }
         else
         {
            snapvalue[xpos]=87.54475f;
            snapvalue[ypos]=-33.4059f;
         }
         fbw.set_translation.setValue(snapvalue);
         fbw.lockFactorBlock( );
            fbc.clip[1].play( );
      }
      break;
   case(plot3x1):
      conxval=4.99053f;
      conyval=10.055282f;
      if(fbw.byblockset=true)
{
      blockpos[xpos]=blockpos[xpos]+conxval;
         blockpos[ypos]=blockpos[ypos]+conyval;
      }
      if((blockpos[xpos]>=90 && blockpos[xpos]<=100)
         && (blockpos[ypos]>=-35 && blockpos[ypos]<=-
         31))
      {
         if(fbw.byblockset true)
         {
            snapvalue[xpos]=97.1331f-conxval;
            snapvalue[ypos]=-33.426514f-conyval;
         }
         else
         {
            snapvalue[xpos]=97.1331f;
            snapvalue[ypos]=-33.426514f;
         }
         fbw.set_translation.setValue(snapvalue);
         fbw.lockFactorBlock( );
            fbc.clip[1].play( );
      }
      break;
   case(plot1x5):
      conxval=15.06323f;
      conyval=-20.068055f;
      if(fbw.byblockset=true)
{
      blockpos[xpos]=blockpos[xpos]-conxval;
         blockpos[ypos]=blockpos[ypos]+conyval;
      }
      if((blockpos[xpos]>=83 && blockpos[xpos]<=89) &&
         (blockpos[ypos]>=-74 && blockpos[ypos]<=-62))
      {
         if(fbw.byblockset=true)
         {
            snapvalue[xpos]=87.2555f +conxval;
            snapvalue[ypos]=-68.419525f-conyval;
         }
         else
         {
            snapvalue[xpos]=87.2555f;
            snapvalue[ypos]=-68.419525f;
         }
         fbw.set_translation.setValue(snapvalue);
         fbw.lockFactorBlock( );
            fbc.clip[1].play( );
      }
      break;
```

```
case(plot3x5):
    conxval=19.94985f;
    conyval=80.126637f;
    if(fbw.byblockset=true)
    {
        blockpos[xpos]=blockpos[xpos]-conxval;
        blockpos[ypos]=blockpos[ypos]-conyval;
    }
    if((blockpos[xpos]>=90 && blockpos[xpos]<=100)
        && (blockpos[ypos]>=-74 && blockpos[ypos]<=-
        62))
    {
        if(fbw.byblockset=true)
        {
            snapvalue[xpos]=97.25273f+conxval;
            snapvalue[ypos]=-67.94629f+conyval;
        }
        else
        {
            snapvalue[xpos]=97.25273f;
            snapvalue[ypos]=-67.94629f;
        }
        fbw.set_translation.setValue(snapvalue);
        fbw.lockFactorBlock( );
        fbc.clip[1].play( );
    }
    break;
default:
    System.out.println("Error, Value not supported");
}//end switch
}//end trackBlock
public void initBlockAttach( )
{
    initattach=true; //set boolean to indicate that the block
        is ready to snap onto another block.
    attachpos=blockpos; //save the coordinate position of
        the first block that was clicked.
    fbwAttach=fbw; //copies the first block to a temporary
        wrapper.
}
private int snapDirection(FactorBlockWrapper fbw1,
    FactorBlockWrapper fbw2)
{
    int snapdir=0; //snap direction return value
    String strfbw1=" ";
    String strfbw2=" ";
    switch(snapdirection){
    case FB_SNAPSIDE:
        strfbw1=fbw1.strwidth.concat("X").concat
            (fbw1.strheight);
        strfbw2=fbw2.strwidth.concat("X").concat
            (fbw2.strheight);
        if (strfbw1.equals(strfbw2))
            snapdir=FB_SNAPSIDE;
        else
            snapdir=VAL_NOMATCH;
        break;
    case FB_SNAPFRONT:
        strfbw1=fbw1.strlength.concat("X").concat
            (fbw1.strheight);
        strfbw2=fbw2.strlength.concat("X").concat
            (fbw2.strheight);
        if (strfbw1.equals(strfbw2))
            snapdir=FB_SNAPFRONT;
        else
            snapdir=VAL_NOMATCH;
        break;
    case FB_SNAPTOP:
        strfbw1=fbw1.strlength.concat("X").concat
            (fbw1.strwidth);
        strfbw2=fbw2.strlength.concat("X").concat
            (fbw2.strwidth);
        if (strfbw1.equals(strfbw2))
            snapdir=FB_SNAPTOP;
        else
            snapdir=VAL_NOMATCH;
        break;
    }//end switch
    return snapdir;
}
public int[ ] addcoordinates(FactorBlockWrapper fbw1,
    FactorBlockWrapper fbw2, int snapdir)
{
    int intfbw1x, intfbw1y, intfbw1z;
    int intfbw2x, intfbw2y, intfbw2z;
    int inttotal;
    int[ ] intadded_coord=new int[3];
    //convert the length, width, and height values of each
        block to int.
    intfbw1x=Integer.parseInt(fbw1.strlength); //convert to
        length
    intfbw1y=Integer.parseInt(fbw1.strwidth); //convert to
        width
    intfbw1z=Integer.parseInt(fbw1.strheight); //convert to
        height
    intfbw2x=Integer.parseInt(fbw2.strlength); //convert to
        length
    intfbw2y=Integer.parseInt(fbw2.strwidth); //convert to
        width
    intfbw2z=Integer.parseInt(fbw2.strheight); //convert to
        height
    switch(snapdir){
    case FB_SNAPSIDE:
        inttotal=intfbw1x+intfbw2x;
        intadded_coord[0]=inttotal; //length value
        intadded coord[ 1]=intfbw1y; //width value
        intadded_coord[2]=intfbw1z; //height value
        break;
    case FB_SNAPFRONT:
        inttotal=intfbw1y+intfbw2y;
        intadded_coord[0]=intfbw1x;
        intadded_coord[1]=inttotal;
        intadded_coord[2]=intfbw1z;
        break;
    case FB_SNAPTOP:
        inttotal=intfbw1z +intfbw2z;
        intadded_coord[0]=intfbw1x;
        intadded coord[ 1]=intfbw1y;
        intadded_coord[2]=inttotal;
        break;
    }
    return intadded_coord;
}
public void attachblocks(FactorBlockWrapper fbw){
    FactorBlockWrapper fbwCurrent;
    int[ ]int_xyz;
    int snapdirection=0;
    fbwCurrent=fbw; //make easier to understand
    if(fbwCurrent=fbwAttach){
        //Do nothing
        initattach=false; //turn off snap mode
    }
```

```
      else {
         snapdirection=snapDirection(fbwCurrent,
            fbwAttach);
         if (snapdirection !=VAL_NOMATCH){
            //remove both selected blocks.
            fbc.removeChildren.setValue
               (fbwAttach.transArray);
            fbc.removeChildren.setValue
               (fbwCurrent.transArray);
            //replace selected blocks with one block, which
               equals the addition of the two blocks.
            int_xyz=addcoordinates(fbwCurrent,fbwAttach,
               snapdirection);
               fbc.addblock(int_xyz[0],int_xyz[1],int_xyz[2],
                  attachpos[0] +(-70.000),attachpos[1]+
                  (130.0));
               fbc.clearfactorpadfields(fbc.XYZ);
               initattach=false;
         }
      }
}//end attachblocks
private int [ ]getorientation(FactorBlockWrapper fbw)
{
   int [ ]intcoord=new int[3];
      intcoord[0]  =Integer.valueOf(fbw.strlength)
         .intValue( );
      intcoord[1]  =Integer.valueOf(fbw.strwidth)
         .intValue( );
      intcoord[2]  =Integer.valueOf(fbw.strheight)
         .intValue( );
      return intcoord;
}
   public void rotateBlock(FactorBlockWrapper fbw, int
      rotatedirection)
   {
      int[ ]intxyz;
      float transformpos_x, transformpos_y=0;
      int blockcolor=0;
      blockcolor=fbw.mycolor; //Get the current block's
         color.
      fp.colorpick=blockcolor; //Assign the current color
         value to the factorpad's colorpick variable.
   //get orientation of the block that will rotate
   intxyz=getorientation(fbw);
   switch(rotatedirection){
      case ROTATE_SIDE:
         transformpos_x=(float) (blockpos[0]+(-
            70.000));
         transformpos_y=(float) (blockpos[1]+130.0)+
            (intxyz[0]* 5);
         fbc.addblock(intxyz[0],intxyz[2],intxyz[1],
            transformpos_ x,transformpos_y);
         break;
      case ROTATE_TOP:
         transformpos_x=(float) (blockpos[0]+(-
            70.000));
         transformpos_y=(float) (blockpos[1]+130.0)+
            (intxyz[0]* 5);
         fbc.addblock(intxyz[1],intxyz[0],intxyz[2],
            transformpos_ x,transformpos_y);
         break;
      case ROTATE_FRONT:
         transformpos_x=(float) (blockpos[0]+(-
            70.000))+(intxyz[0]* 5);
         transformpos_y=(float) (blockpos[1]+130.0);
         fbc.addblock(intxyz[2],intxyz[1],intxyz[0],
            transformpos_ x,transformpos_y);
            System.out.println("rotate side");
         break;
      }
         fbc.removeChildren.setValue(fbw.transArray);
         //remove previous block
      }
}//end class
Call From: FactorBlockControl( )
Call To:
Purpose: The purpose of this class is to wrap the Factor-
   Block with a plane sensor node
*/
import java.lang.*;
import java.applet.*;
import vrml.external.field.*;
import vrml.external.exception.*;
import vrml.external.Node;
import vrml.external.Browser;
import FactorBlockControl;
public class FactorBlockWrapper extends Object imple-
   ments EventOutObserver {
   //DECLARE VARIABLES
   public final static int FACTORBLOCK=0; //indicates
      the type of wrapper to use.
   public final static int GREEN=0;
   public final static int BLUE=1;
   public final static int RED=2;
   public String fb_xyz; //identifies a factorblock by its
      dimensions.
   public int intfb_xy; //identifies a factorblock by its x,y
      multiplied dimensions
   public int intfb xyz; //identifies a factorblock by its
      x,y,z multiplied dimensions
   public String strlength; //stores the length value
   public String strwidth; //stores the width value
   public String strheight; //stores the height value
   public int mycolor; //stores the color for this block
      0=green, 1=blue, 2=red
   public boolean blocklockset=false; //indicates if a route
      is set or not for this factorblock.
   public boolean byblockset=false; //indicates whether
      this block was created by make block set.
   //Nodes that will be dynamically added. public Node
      transform; //stores a reference to the Transform {
      }node
   //public Node appearance; //stores a reference to the
      Appearance { }node
   //public Node material; /stores a reference to the Mate-
      rial{ }node
   public Node planesensor; //stores a reference to the
      PlaneSensor{ }node.
   //Each store a collection of nodes
   //generated from the CreateVRMLFromSrtring
   //command.
   public Node[ ]transArray; //stores a reference to an
      array containing Transform { }
   public Node[ ]plnesensArray; //stores a reference to an
      array containing PlaneSensor{ }
   public Node[ ]matArray; //stores a reference to an array
      containing Material{ }
   public Node[ ]shapeArray; //stores a reference to an
      array containing Shape { }
   public Node[ ]appArray; //stores a reference to an array
      containing Appearance{ }
   public Node[ ]tchsensArray; //stores a reference to an
      array containing TouchSensor{ }
```

```
public Node[ ]fb; //stores a reference to an array
    containing all the nodes
    // of a factorblock
// EventIns we'll modify
public EventInSFRotation set_rotation; //stores a ref-
    erence to the set_rotation field
public EventInSFVec3f set_scale; //stores a reference
    to the set_scale field public EventInSFVec3f set_
    translation; //stores a reference to the set_translation
    field
public EventInSFColor set_diffuseColor; //stores a ref-
    erence to the set_diffuseColor field
EventOuts we'll query
public EventOutSFRotation rotation_changed; //stores
    a reference to the rotation changed field
public EventOutSFVec3f scale_changed; //stores a ref-
    erence to the scale_changed field
public EventOutSFVec3f translation_changed; //stores
    a reference to the translation_changed field
public EventOutSFColor diffuseColor_changed;
    //stores a reference to the diffuseColor_changed
    field
public EventOutSFTime touchTime_changed; //stores
    a reference to the touchTime_changed field
//variables only used in this class
private FactorBlockControl fbc; H/reference to the
    current FactorBlockControl
private Browser browser; //Browser(Cosmo Player)
    we're using to instantiate these nodes
FactorBlockWrapper(FactorBlockControl fbc, String
    fbspec, int whichType) throws IllegalArgumentEx-
    ception {
this. fbc=fbc; //Assign FactorBlockControl reference to
    local variable
browser=fbc.getBrowser( ); //Get browser object
    already created by FactorBlockControl
//gets values to calculate a unique block indentifier.
int pos_beg=fbspec.indexOf("BLOCK"); //stores the
    beginning position of the word "BLOCK"
int pos_end=fbspec.indexOf(" ",pos beg); //stores the
    ending position of the the "BLOCK
    fb_xyz=fbspec.substring(pos_beg+5,pos_end);
        //Get the FactorBlock's dimensions
int int1Xpos=fb_xyz.indexOf("X"); //Gets the 1st
    position of "X" in fb_xyz
int int2Xpos=fb_xyz.indexOf("X",int1Xpos+1); //Get
    the 2nd position of "X" in fb_xyz
    strlength=fb_xyz.substring(0,int1Xpos); //Gets the
        length value in fb_xyz
    strwidth=fb_xyz.substring(int1Xpos+1,int2Xpos);
        //Gets the width value in fb_xyz
    strheight=fb_xyz.substring(int2Xpos+1,fb_
        xyz.length( )); //Get the height value in fb_xyz
    //multiplies the length and width values to uniquely
        identify the factor block.
    intfb_xy=Integer.valueOf(strlength).intValue( ) *
        Integer.valueOf(strwidth).intValue( );
    intfb_xyz=Integer.valueOf(strlength).intValue( ) *
        Integer.valueOf(strwidth).intValue( )
* Integer.valueOf(strheight).intValue( );
    //Check type to create from FactorBlockControl.
    if                               ((whichType
    !=FactorBlockWrapper.FACTORBLOCK)){
        //If the type coming in is not recognized then throw
            en exception.
        throw(new IllegalArgumentException( ));
} try {
    //Create VRML nodes.
        transArray=browser.createVrmlFromString
            ("Transform { }");
    //shapeArray=browser.createVrmlFromString("Shape
        { }");
    //appArray=browser.createVrmlFromString
        ("Appearance { }");
    //matArray=browser.createVrmlFromString("Material
        {diffuseColor .5 .5 .5}");
    tchsensArray=browser.createVrmlFromString
        ("TouchSensor { }");
    //plnesensArray=browser.createVrmlFromString
        ("PlaneSensor {minPosition −25 −77 maxPosition
        115 10}");
    plnesensArray=browser.createVrmlFromString
        ("PlaneSensor { }");
    //If passed type is a FactorBlock
    if                               (whichType=
    FactorBlockWrapper.FACTORBLOCK){
        //Create a block from the block specification passed
            from FactorBlockControl.
        fb=browser.createVrmlFromString(fbspec);
    }
}catch (InvalidVrmlException e){
    System.out.println("PROBLEMS!:"+e);
}
try {
    // Get the first VRML node reference from corre-
        sponding array references.
    transform=transArray[0];
    //material=matArray[0];
        //appearance=appArray[0];
    planesensor=plnesensArray[0];
    //Create single node instances
    //EventInSFNode nodeIn;
    //Create multiple node instances
    EventInMFNode nodesIn=(EventInMFNode)
        transform.getEventIn("addChildren");
    //Put objects in the node.
    nodesIn.setValue(fb);
    nodesIn.setValue(plnesensArray); //planesensor
    nodesIn.setValue(tchsensArray); //touchsensor
    this.unlockFactorBlock( ); //enables the block to move.
    //Grab Instances of EventIns and EventOuts of trans-
        form and material node
    //set_scale=(EventInSFVec3f) transform.getEventIn
        ("scale");
        //set_rotation=(EventInSFRotation)
            transform.getEventIn("rotation");
    set_translation=(EventInSFVec3f)
        transform.getEventIn("set_translation");
    //set_diffuseColor=(EventInSFColor)
        material.getEventIn("diffuseColor");
    //scale_changed=
    //(EventOutSFVec3f) transform.getEventOut("scale");
        translation_changed=
        (EventOutSFVec3f) transform.getEventOut
            ("translation");
    //rotation_changed=
    //(EventOutSFRotation) transform.getEventOut
        ("rotation");
//diffuseColor_changed=
    //(EventOutSFColor) material.getEventOut
        ("diffuseColor");
    touchTime_changed=
        (EventOutSFTime) tchsensArray[0].getEventOut
            ("touchTime");
```

```
// Set EventOut callback for this clump's touch sensor,
// so we can later read in its values when it's clicked
   touchTime_changed.advise(this, null);
}//end try block
   catch (InvalidEventInException e){
      System.out.println("PROBLEMS!: "+e);
   }
   catch (InvalidEventOutException e){
      System.out.println("PROBLEMS!: "+e);
   }
   catch (ArrayIndexOutOfBoundsException e){
      System.out.println("Problem! "+e);
   }
}//End Constructor
//Adds a route from the PlaneSensor to this FactorBlock
   wrapper's
//set translation field allowing this FactorBlock to move
   public void unlockFactorBlock( )
{
   browser.addRoute(planesensor, "translation_change",
      transform "set_translation");
      blocklockset=false;
}
//Removes a route from the PlaneSensor to the Factor-
   Blocks wrapper's
//set_translation field preventing this FactorBlock to
   move
   public void lockFactorBlock( )
{
   browser.deleteRoute(planesensor,"translation_
      changed",transform, "set_translation");
      blocklockset=true;
}
//Handle the callback every time this wrapper's Touch-
   Sensor is clicked.
   public void callback(EventOut event, double time,
      Object userdata){
      // Make ourselves the current clump
      fbc.makeCurrent(this);
   }
}
Purpose: The purpose of this class is to display a control
   panel used to initiate the creation of Factor Blocks.
Calls To:
Calls From:
*/
import java.awt.*;
import java.applet.*;
import java.lang.*;
import java.awt.image.*;
import java.net.*;
import java.awt.event.*;
import vrml.external.field.*;
import vrml.external.Node;
import vrml.external.Browser;
import vrml.external.exception.*;
public class FactorPad extends Panel {
   //Declare variables for objects
   Font fntvbm; //Stores value for a font type
   //Create text field references
   TextField txtxinput; //Stores value for length
   TextField txtyinput; //Stores value for width
   TextField txtzinput;//Stores value for height
   TextField txtresult; //Stores result
   //Create label references
   Label lbllength; //Label for length
   Label lblwidth; //Label for width
   Label lblheight; //Label for height
   Label lblnumber; //Label for number
   Label lbltimes1; //Label for 'X'
   Label lbltimes2; //Label for 'X'
   Label lblequal; //Label for '='
   Label lblspace; //Label for ' '
   //Create button references
   Button btnmakeblock; //References 'Make Block' button
   Button btnmakeblockset; //References 'Make Block
      Set' button
   Button btnremoveblock; //References 'Remove Block'
      button
   Button btnremoveall; //References 'Remove All' button
   Button btnsnapfront; //References 'Snap Front' button
   Button btnsnaptop; //References 'Snap Top' button
   Button btnsnapside; //References 'Snap Side' button
   Button btnrotatefront; //References 'Snap Front' button
   Button btnrotatetop; //References 'Snap Top' button
   Button btnrotateside; //References 'Snap Side' button
   //Create panel references
   Panel pnldataentry; //References panel that holds the
      data entry text fields.
   Panel pnlmakeblock; //References panel that holds the
      'Make Block' button
   Panel pnlmakeremoveblock; //References panel that
      holds the 'Make Block Set',
   'Remove Block', 'Remove All' buttons.
   Panel pnlsnapblock; //References panel that holds the
      'Snap Front','Snap Top', 'Snap Side' buttons.
   Panel pnlrotateblock; //References panel that holds the
      'Rotate Front','Rotate Top', 'Rotate Side' buttons.
   boolean aborted=false;
   //Color Constants
   public final static int GREEN=0;
   public final static int BLUE=1;
   public final static int RED=2;
   public final static int INIT=0;
   public final static int ALLOFF=1;
   public final static int ALLON=2;
   //Initialize the color with which the block is drawn
   public int colorpick=GREEN;
   public void paint(Graphics g)
   {
      //Draw three rectangles, green,red, and blue, respec-
         tively.
      g.setColor(Color.blue);
         g.fill3DRect(5,105,90,20,false);
         g.setColor(Color.red);
         g.fill3DRect(100,105,90,20,false);
         g.setColor(Color.green);
         g. fill3DRect(195,105,90,20,false);
         //Set the color of the black rectangle that will sur-
            round one of the three
         //colored rectangles.
         g.setColor(Color.black);
         switch (colorpick){
         case GREEN:
            g.drawRect(190,100,100,30);
            break;
         case RED:
            g.drawRect(95, 100,100,30); break;
```

```
      case BLUE:
        g.drawRect(0,100,100,30); break;
    }
    g.dispose( );
}
public FactorPad( )
{
  //Create object instances
  fntvbm=new Font("Monospaced",Font.BOLD,12);
    //Create and set new Font object
//CREATE DATA ENTRY PANEL
  //Create labels
  lbllength=new Label("Length",Label.CENTER);
  lbllength.setFont(fntvbm);
  lblwidth=new Label("Width",Label.CENTER);
  lblwidth.setFont(fntvbm);
  lblheight=new Label("Height",Label.CENTER);
  lblheight.setFont(fntvbm);
  lblnumber=new Label("Volume",Label.CENTER);
  lblnumber.setFont(fntvbm);
  lbltimes1=new Label("X",Label.CENTER);
  lbltimes1.setFont(fntvbm);
  lbltimes2=new Label("X",Label.CENTER);
  lbltimes2.setFont(fntvbm);
  lblequal=new Label("=",Label.CENTER);
  lblequal.setFont(fntvbm);
  lblspace=new Label (" ",Label.CENTER);
  //Create Text fields
  txtxinput=new TextField(4);
  txtyinput=new TextField(4);
  txtzinput=new TextField(4);
  txtresult=new TextField(6);
  //Create new GridBag object
  GridBagLayout gblayout=new GridBagLayout( );
  GridBagConstraints gbc=new GridBagConstraints( );
  //Create Data Entry Panel
  pnldataentry =new Panel( );
  pnldataentry.setLayout(gblayout);
  pnldataentry.setBackground(Color.lightGray);
  //Set the FactorPad Panel layout to use GridBag
  this.setLayout(gblayout);
  this.setBackground(Color.lightGray);
//Add data entry objects to Panel, pnldataentry
  //Add Label, lbllength
gbc.gridwidth=1;
gbc.weighty =0.0;
gbc.weightx =1.0;
gblayout.setConstraints(lbllength,gbc);
pnldataentry.add(lbllength);
//Add Label, lblwidth
  gbc.gridwidth=3;
gblayout.setConstraints(lblwidth, gbc);
pnldataentry.add(lblwidth);
  //Add Label, lblheight
  gbc.gridwidth=1;
gblayout.setConstraints(lblheight, gbc);
pnldataentry.add(lblheight);
  //Add Label, lblresult
  gbc.gridwidth=1;
  gbc.gridwidth=GridBagConstraints.REMAINDER;
gblayout.setConstraints(lblnumber, gbc);
pnldataentry.add(lblnumber);
  //Add TextField, txtxinput
  gbc.gridwidth=1;
  gblayout.setConstraints(txtxinput,gbc);
pnldataentry.add(txtxinput);
  //Add Label, lbltimes1
  gbc.gridwidth=1;
gblayout.setConstraints(lbltimes1,gbc);
pnldataentry.add(lbltimes1);
  //Add TextField, txtzinput
  gbc.gridwidth=1;
gblayout.setConstraints(txtzinput,gbc);
pnldataentry.add(txtzinput);
  //Add Label, lbltimes2
  gbc.gridwidth=1;
gblayout.setConstraints(lbltimes2,gbc);
pnldataentry.add(lbltimes2);
  //Add TextField, txtyinput
gbc.gridwidth=1;
  gblayout.setConstraints(txtyinput,gbc);
pnldataentry.add(txtyinput);
  //Add Label, lblequal
  gbc.gridwidth=1;
gblayout.setConstraints(lblequal, gbc);
pnldataentry.add(lblequal);
  //Add TextField, txtresult
gbc.gridwidth=1;
  gblayout.setConstraints(txtresult,gbc);
pnldataentry.add(txtresult);
  //Add space between panels
gbc.gridwidth=1;
  gbc.gridwidth=GridBagConstraints.REMAINDER;
  gblayout.setConstraints(lblspace,gbc);
pnldataentry.add(lblspace);
  //Add Data Entry panel to FactorPad panel
  gbc.anchor=GridBagConstraints.WEST;
  gbc.gridwidth=1;
  gbc.gridheight=5;
gblayout.setConstraints(pnldataentry,gbc);
  add(pnldataentry);
//CREATE MAKE BLOCK BUTTON PANEL
  //Create button
  btnmakeblock=new Button("Make Block");
  btnmakeblock.setFont(fntvbm);
  //Create and initialize panel
  pnlmakeblock=new Panel( );
  pnlmakeblock.setLayout(new BorderLayout( ));
  pnlmakeblock.setBackground(Color.lightGray);
  pnlmakeblock.add(btnmakeblock,"Center");
  //Set GridBag constraints
  gbc.gridwidth=1;
  gbc.fill=GridBagConstraints.VERTICAL;
  gblayout.setConstraints(pnlmakeblock,gbc);
  //Add Make Block Panel to FactorPad
  add(pnlmakeblock);
//CREATE MAKE/REMOVE BLOCK PANEL
  //Create button and set font
  btnmakeblockset=new Button("Make Block Set");
  btnmakeblockset.setFont(fntvbm);
  btnremoveblock=new Button("Remove Block");
  btnremoveblock.setFont(fntvbm);
  btnremoveall=new Button("Remove All");
  btnremoveall.setFont(fntvbm);
  //Create and initialize panel
  pnlmakeremoveblock=new Panel( );
  pnlmakeremoveblock.setLayout(new GridLayout(3,
    1));
  pnlmakeremoveblock.setBackground
    (Color.lightGray);
```

```
//Add Buttons to panel
pnlmakeremoveblock.add(btnmakeblockset);
pnlmakeremoveblock.add(btnremoveblock);
pnlmakeremoveblock.add(btnremoveall);
//Set GridBag constraints
  gbc.gridwidth=1;
  gbc.fill=GridBagConstraints.NONE;
gblayout.setConstraints(pnlmakeremoveblock,gbc);
  //Add Make Block Panel to FactorPad
  add(pnlmakeremoveblock);
//CREATE SNAP BLOCK PANEL
  //Create button
  btnsnapfront=new Button(" Snap Front ");
  btnsnapfront.setFont(fntvbm);
  btnsnaptop=new Button("Snap Top");
  btnsnaptop.setFont(fntvbm);
  btnsnapside=new Button("Snap Side");
  btnsnapside.setFont(fntvbm);
  //Create and initialize panel
  pnlsnapblock=new Panel( );
  pnlsnapblock.setLayout(new GridLayout(3,1));
  pnlsnapblock.setBackground(Color.lightGray);
  //Add Buttons to panel
  pnlsnapblock.add(btnsnapfront);
  pnlsnapblock.add(btnsnaptop);
  pnlsnapblock.add(btnsnapside);
  //Set GridBag constraints
  gbc.gridwidth=GridBagConstraints.RELATIVE;
  gbc.gridwidth=1;
gblayout.setConstraints(pnlsnapblock,gbc);
  //Add Make Block Panel to FactorPad
add(pnlsnapblock);
//CREATE ROTATE BLOCK PANEL
  //Create button
  btnrotatefront=new Button(" Rotate Front ");
  btnrotatefront.setFont(fntvbm);
  btnrotatetop=new Button("Rotate Top");
  btnrotatetop.setFont(fntvbm);
  btnrotateside=new Button("Rotate Side");
  btnrotateside.setFont(fntvbm);
  //Create and initialize panel
  pnlrotateblock=new Panel( );
  pnlrotateblock.setLayout(new GridLayout(3,1));
  pnlrotateblock.setBackground(Color.lightGray);
  //Add Buttons to panel
  pnlrotateblock.add(btnrotatefront);
  pnlrotateblock.add(btnrotatetop);
  pnlrotateblock.add(btnrotateside);
  //Set GridBag constraints
  gbc.gridwidth=GridBagConstraints.REMAINDER;
  gbc.gridwidth=1;
gblayout.setConstraints(pnlsnapblock,gbc);
  //Add Make Block Panel to FactorPad
  add(pnlrotateblock);
  setEnableButtons(INIT);
}//End Contructor
public void setEnableButtons(int state)
{
  switch (state)
  {
    case (INIT):
    btnmakeblock.setEnabled(true);
      btnmakeblockset.setEnabled(true);
    btnremoveblock.setEnabled(false);
      btnremoveall.setEnabled(false);
      btnsnapfront.setEnabled(false);
      btnsnaptop.setEnabled(false);
      btnsnapside.setEnabled(false);
      btnrotatefront.setEnabled(false);
      btnrotatetop.setEnabled(false);
      btnrotateside.setEnabled(false);
    break;
    case(ALLON):
    btnmakeblock.setEnabled(true);
      btnmakeblockset.setEnabled(true);
    btnremoveblock.setEnabled(true);
      btnremoveall.setEnabled(true);
      btnsnapfront.setEnabled(true);
      btnsnaptop.setEnabled(true);
      btnsnapside.setEnabled(true);
      btnrotatefront.setEnabled(true);
      btnrotatetop.setEnabled(true);
      btnrotateside.setEnabled(true);
    break;
    case(ALLOFF):
    btnmakeblock.setEnabled(false);
      btnmakeblockset.setEnabled(false);
    btnremoveblock.setEnabled(false);
      btnremoveall.set Enabled(false);
      btnsnapfront.setEnabled(false);
      btnsnaptop.setEnabled(false);
      btnsnapside.setEnabled(false);
      btnrotatefront.setEnabled(false);
      btnrotatetop.setEnabled(false);
      btnrotateside.setEnabled(false);
    break;
  }//end switch
}
public static void main(String args[ ])
{
  Frame f=new Frame("Test");
  FactorPad fp=new FactorPad( );
  f.add(fp);
  f.setSize(500,200);
  f.setVisible(true);
}
}
```

Without further elaboration, it is believed that one skilled in the art can, using the preceding description, utilize the present invention to its fullest extent. The preceding preferred specific embodiments are, therefore, to be construed as merely illustrative, and not limiting of the remainder of the disclosure in any way whatsoever. The entire disclosure of all applications, patents and publications, cited above and in the figures are hereby incorporated by reference.

What is claimed is:

1. A method of designing a virtual manipulative tool bar for teaching mathematical principles, comprising:

a) retrieving and displaying a design template means from a storage means, said design template means comprising:

a virtual manipulative design means, comprising a drawing tool to draw a virtual manipulative;

b) drawing said virtual manipulative using said drawing tool;

c) assigning properties to said virtual manipulative, said properties comprising physical properties, mathematical properties, and functional properties, said properties enabling a user to manipulate said virtual manipulative for a specified activity;

d) generating a virtual manipulative tool bar, wherein said tool bar comprises an icon representing said completed virtual manipulative, said icon for retrieving and displaying said virtual manipulative and for linking said assigned properties with a user interface; and e) storing said virtual manipulative tool bar in a storage means for future use by a user.

2. A method of claim 1, further comprising:

a) retrieving and displaying said virtual manipulative tool bar.

3. A method of claim 1, wherein the activity template means further comprises:

an activity design means, comprising a text tool.

4. A method of claim 1, wherein said activity template means further comprises:

a means for linking said virtual manipulative and an activity using said virtual manipulative.

5. A method of claim 1, wherein said activity template means further comprises:

a means for linking said virtual manipulative and an activity using said virtual manipulative.

6. A method of claim 3, further comprising inputting text using said text tool and storing said text in a storage means.

7. A method of claim 3, further comprising:

inputting text using said text tool and storing said text in a storage means;

retrieving and displaying said virtual manipulative tool bar; and retrieving and displaying said text.

8. A method of claim 7, wherein said text is directions for performing an activity using said virtual manipulative.

9. A method of claim 1 which is implemented in Java or HTML.

10. A method of claim 1 which is implemented in Java, HTML, and VRML.

11. A system for designing virtual manipulatives comprising:

a means for performing the method of claim 1.

12. A method for learning a mathematical principle involving fractions and/or geometric concepts, comprising:

a) retrieving and displaying an activity from a storage means, wherein said activity requires a user to manipulate one or more virtual manipulatives, and b) retrieving and displaying a menu bar comprising a tool bar, wherein said tool bar is effective to retrieve and display a virtual manipulative, and one or more operational tools effective to manipulate said virtual manipulative, wherein said tool bar is created using a method of claim 1.

13. A method of claim 12, further comprising:

c) performing said activity, comprising manipulating said virtual manipulative using said operation tools.

\* \* \* \* \*